Jan. 1, 1935.  F. A. HAYES  1,986,264
VARIABLE SPEED TRANSMISSION MECHANISM
Filed Aug. 9, 1933
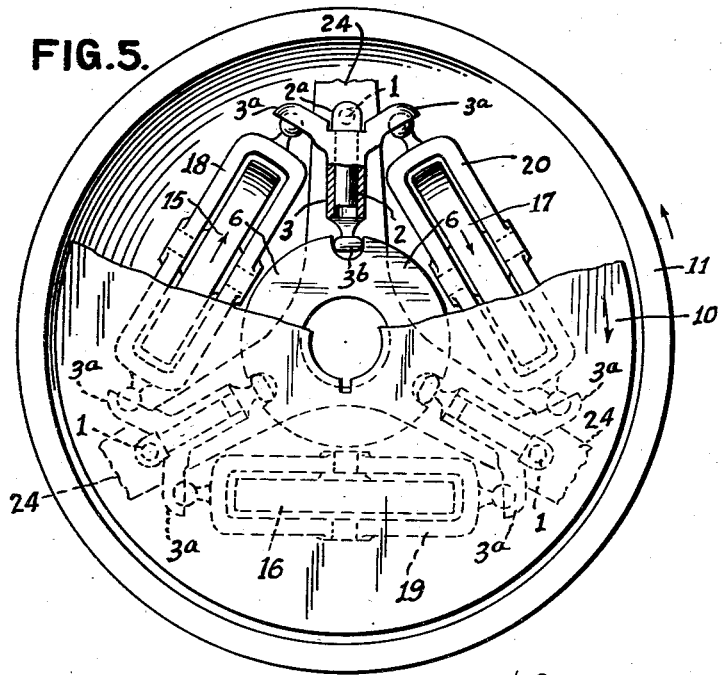
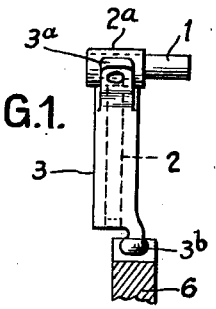
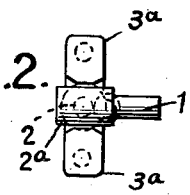
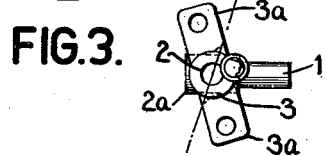
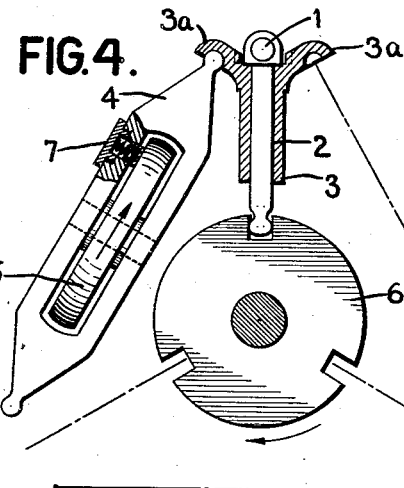
INVENTOR
Frank A. Hayes
BY
Cooper, Kerr & Dunham
ATTORNEYS Patented Jan. 1, 1935

1,986,264

UNITED STATES PATENT OFFICE 1,986,264

VARIABLE SPEED TRANSMISSION MECHANISM

Frank A. Hayes, Middletown, N. J.

Application August 9, 1933, Serial No. 684,360
In Great Britain August 12, 1932

9 Claims. (Cl. 74—200)

This invention relates to variable speed transmission mechanism and has particular reference to mechanism of the torus disk type in which a set of rockable frictional rollers operates between the opposed torus surfaces of coaxial driving and driven disks.

The present invention is an improvement in or modification of the gearing claimed in my Patent No. 1,865,102 wherein the rollers are mounted in carriers supported in rockers pivoted to rock in or substantially in a plane parallel to the planes of the disks for the purpose of causing or initiating precession of the rollers.

In the patent referred to I have explained that the effect of inclining the axes of the roller carriers with respect to the planes in which the disks rotate is to co-ordinate the positions of the control mechanism and the angular positions of the roller axes with respect to the axis of the disks, (i. e. the speed ratio of the transmission). The rollers are so mounted in their carriers that the axis of each roller swings in a plane perpendicular to the axis of its carrier and that if the latter axis is inclined to the axis of the disks, then the plane in which the roller axis swings is inclined to the axis of the disks. For any equilibrium position of the roller its axis intersects the disk axis, the point of intersection being the point at which the disk axis passes through the plane in which the roller axis swings.

Suppose now that with the transmission running in a given direction, say forward, the control is moved to a new speed ratio position. This either displaces or tilts the carrier or both but in any case moves the roller axis out of intersection with the disk axis causing the latter to intersect at a new point the plane in which the roller axis swings. Precession of the roller is thus initiated but the direction of swing of the roller axis is such as to cause it to move towards this new point of intersection and when it reaches it equilibrium is again established and a new speed ratio position is attained.

Suppose now with the disk or disks rotating in the reverse direction, that the control is moved as before. Precession is again initiated but the roller axis now swings away from instead of toward the new point of intersection of the disk axis with the "precession plane" and hence precession continues until the roller runs off the disks or is stopped by some "angle" stop such as shown at 21ᵇ in Figure 1 of the drawings of my Patent No. 1,865,102.

Hence it will be seen that there is a relation between the direction of inclination of the carriers and the direction of rotation of the transmission, for proper coordination of control movement and speed ratio; and that for the opposite direction of rotation of the transmission even though the roller axis intersects the disk axis the mechanism is in unstable equilibrium because under such reversed rotation a slight displacement of the roller axis out of the intersection position initiates precession in a direction which increases this displacement and accelerates the precession and consequently it is in such cases impossible to predetermine the speed ratio of the transmission by means of the control.

On the other hand it must be understood that if the transmission is torque responsive and the control is not fixed in position but is free to move or be acted upon by some yielding means such as a spring or fluid pressure the transmission will (under the above conditions of reversed rotation) assume and maintain any speed ratio which may be imposed upon it by conditions at the driving and driven ends.

From the above explanation it will be seen that to co-ordinate the control with the roller position (i. e. speed ratio position) for both directions of rotation the inclination of the carrier axes to the disks must be reversed when the direction of rotation of the transmission is reversed and the present invention in its broad aspect comprises means for bringing about such reversal of inclination. For this purpose one mode of realization is to make each rocker in two relatively movable pieces.

For simplicity of further description reference will now be made to the accompanying drawing which illustrates two embodiments of a two-piece rocker according to the present invention but it is to be understood that the invention is not in any sense limited thereto.

Figure 1 is an elevation of one form of the two-piece rocker,

Figure 2 is a plan view from above, and

Figure 3 is a plan view looking upwards from below and showing one piece in one of its extreme positions, the other position being indicated by a dotted centre line.

Figure 4 is a sectional elevation showing somewhat diagrammatically the essential features of a modified form of rocker with associated control member, and also an associated roller carrier with roller. Like reference numerals indicate like parts in the two embodiments.

Fig. 5 is an end view illustrating a transmission mechanism, showing two disks and three interposed rollers mounted in carriers supported by two-piece rockers in accordance with the present invention.

Referring first to Fig. 5, two co-axial torus disks 10, 11, are shown. Rollers cooperating with the disks are shown at 15, 16, 17, mounted to rotate in carriers 18, 19, 20, supported by their ball ends by rockers pivoted at 1 on a spider 24. The rockers extend radially inward and by their ball ends engage peripheral recesses in a control disk 6. Being supported by their ball ends, the carriers, with the rollers mounted therein, are free to rock about the carrier axes passing through the respective ball ends, and it is now well known that if while the disks are rotating the carriers are displaced bodily (for example, roller 15 downwardly and leftwardly, roller 16 rightwardly and roller 17 upwardly and leftwardly), or if the carriers are tilted in their own plane (as for example, in the case of roller 15 by tilting its carrier clockwise about the axis on which the roller rotates in its carrier), or if the actuation of the carriers is partly displacement and partly tilting, the roller-and-carrier assemblies will rock automatically, thereby changing the speed-ratio of the mechanism. This automatic rocking adjustment on the carrier axes to vary the speed-ratio is conveniently termed "precession" in my prior patent above referred to, No. 1,865,102, where such mode of adjustment is fully explained. In the construction illustrated in Fig. 5 the actuation of the carriers to cause the rollers to precess is effected by rocking the rockers on their pivots 1. This rocking movement of the rockers is brought about by relative rotation of the control member 6 by any suitable means, not shown.

In the embodiment illustrated in Figures 1, 2, 3, and 5 the reference numeral 1 indicates a rocker pin fitted into the cross bar 2ᵃ of a T-shaped rocker piece, 2, 2ᵃ, the stem 2 of which is surrounded by the cylindrical body portion 3 of a rocker piece 3, 3ᵃ, the transverse arms 3ᵃ of which embrace the cross bar 2ᵃ and serve as sockets for the ball ends of the roller carriers. The arms 3ᵃ of the rocker piece 3, 3ᵃ are formed with just sufficient clearance from the cross bar 2ᵃ of the other rocker piece to allow the rocker piece 3, 3ᵃ, to swing around the axis of the stem 2 enough to produce the required offset of the sockets in either direction to provide the required inclination of the roller carriers 4. In the arrangement shown in Figure 1 the lower end of the cylindrical body portion 3 of the rocker piece 3, 3ᵃ, is cranked or offset to provide the ball end 3ᵇ which engages the respective slot or hole in the control member 6. Now suppose that the rollers (Fig. 5) are driving the disk 11 which in turn drives the load. Disk 11 therefore tends to cause the rollers (Fig. 5) to move in planetary fashion, clockwise; but this is equivalent to counter-clockwise rotation of the control member 6, since the rockers are connected to the latter by their ball ends 3ᵇ; and since these ball ends are offset (see Fig. 1) with respect to the plane in which the rollers tend to move clockwise, the net result is that instead of the rollers moving in that manner, the rocker bodies 3—3ᵃ turn on the stems 2. Thus in Fig. 5, the rocker body 3—3ᵃ at the top of the figure is turned clockwise, as viewed from above, and it will be clear that this movement, and like movement of the other rocker bodies, inclines the axes of precession in the direction of the rotation of the rollers, as if the rollers, rotating about their axes, had given their carriers a slight movement of rotation in the same direction about the centers of the rollers. It will also be seen that if the disks are reversed (and consequently the rollers also) in direction of rotation, the rocker bodies 3—3ᵃ will be swung in the opposite direction on the stems 2 and thereby reverse the inclination of the precession axes. The load reaction on this ball end 3ᵇ thus serves to swing the rocker around its axis in one direction or the other whenever this reaction is reversed. This reaction may, of course, be reversed without reversal in the direction of rotation as when the load overtakes, as it were, the driving device and tends to drive it but in most applications this is a relatively unimportant and temporary condition and the driving and driven devices may as previously explained be allowed to control the speed ratio while it lasts.

In the alternative construction shown in Figure 4 the rocker is not cranked at its lower end and engagement with the control member 6 is provided by a ball end at the foot of the stem 2 of the T-shaped rocker piece 2, 2ᵃ, and a friction shoe 7 or similar device (which may, for example, be of a toggle or centrifugal type so as to be effective only on reversal or at very low speeds) is provided between each roller and its respective carrier so as to put a torque on the carrier about the roller axis and cause the rocker arms 3ᵃ to swing into the desired position for correct carrier inclination. Upon reflection and study of the geometric relations involved it will be seen that the desired inclination of the carrier is always in the direction of roller rotation.

What I claim is:—

1. In a power transmission mechanism, in combination, co-axial torus disks, precessing rollers between the disks and cooperating therewith, carriers for said rollers, supports for the carriers, and means controlled by the direction of rotation of the disks to incline the axes of precession in the direction of rotation of the rollers.

2. In a power transmission mechanism, in combination, co-axial torus disks, interposed rollers cooperating therewith, roller carriers movable to cause precession of the rollers on axes inclined to the planes of the disks, pivoted two-piece rockers for supporting and actuating the carriers to cause such precession, the two-pieces of each rocker being angularly movable relatively to one another to reverse the inclination of the precession axes when the rotation of the disks is reversed in direction, means for limiting the relative angular movement of the rocker pieces, and a control member cooperating with a rocker piece of each rocker to rock the same and thereby actuate the carriers to cause the rollers to precess.

3. In a power transmission mechanism, in combination, co-axial torus disks, and interposed rollers cooperating therewith, roller carriers movable to cause precession of the rollers on axes inclined to the planes of the disks, pivoted two-piece rockers for supporting and actuating the carriers to initiate such precession, one piece of each rocker having carrier supporting means and being pivotally mounted on the other for angular movement relative thereto about an axis radial to the axis of the disks, means for limiting said relative angular movement, and a control member cooperating with a rocker piece of each rocker to rock the same for actuating the carriers.

4. In a power transmission mechanism, in combination, co-axial torus disks and interposed friction rollers cooperating therewith, roller carriers movable to cause precession of the rollers on axes inclined to the planes of the disks; two-piece rockers, one piece pivoted to rock transversely on an axis parallel to the axis of the disks, the other mounted on the first for angular movement relative thereto on an axis at an angle to the axis of the first and having roller-carrier supporting means; and means controlled by the direction of rotation of the rollers to move the second mentioned rocker piece angularly relatively to the other.

5. In a power transmission mechanism, in combination, co-axial torus disks and interposed friction rollers cooperating therewith, roller carriers movable to cause precession of the rollers on axes inclined to the planes of the disks; two-piece rockers, one piece of each pivoted to rock transversely of the axis of the disks, the other pivoted on the first for rocking movement relative thereto on an axis radial to the axis of the disks and having laterally extending roller-carrier supporting arms; and means controlled by the direction of rotation of the disks to rock the second mentioned rocker piece on the other to incline the carrier axes to the planes of the disks.

6. In a power transmission mechanism, in combination, co-axial torus disks, precessing rollers between the disks and cooperating therewith, carriers for said rollers, supporting rockers for the carriers adapted for rotation of the carriers in the direction of rotation of the rollers about the centers of the latter, means for so rotating the carriers upon change of direction of rotation of the rollers, and means for limiting such rotation of the carriers.

7. In a power transmission mechanism, in combination, co-axial torus disks; interposed precessing rollers co-operating therewith; carriers for the rollers; rockers for supporting and actuating the carriers to cause the rollers to precess, said rockers comprising members pivoted to swing transversely of the axis of the disk and having stems extending radially of the disk axis, and members carried by said stems to turn thereon and having laterally extending arms supporting the carriers; means for imparting a movement of rotation to the carriers in the direction of the rotation of the respective rollers about the centers thereof; and means for limiting the turning movement of the carrier-supporting rocker-members and the said movement of rotation of the carriers.

8. In a power transmission mechanism, in combination, co-axial torus disks, interposed precessing rollers cooperating therewith, carriers for the rollers adapted to rotate in the direction of rotation of their rollers about the centers thereof, rocking supports for the carriers, inter-engaging means between the rollers and the respective carriers enabling the rollers to so rotate the carriers, and means for limiting such rotation of the carriers.

9. In a power transmission mechanism, in combination, co-axial torus disks, interposed precessing rollers cooperating therewith, carriers for the rollers adapted to rotate in the direction of rotation of their rollers about the centers thereof, rocking supports for the carriers, friction shoes carried by the carriers to engage the respective rollers and cause said rotation of the carriers, and means to limit such rotation.

FRANK A. HAYES.